Feb. 27, 1968  W. E. BUCK ET AL  3,370,504
HIGH SPEED FACSIMILE METHOD AND APPARATUS
Filed March 29, 1965
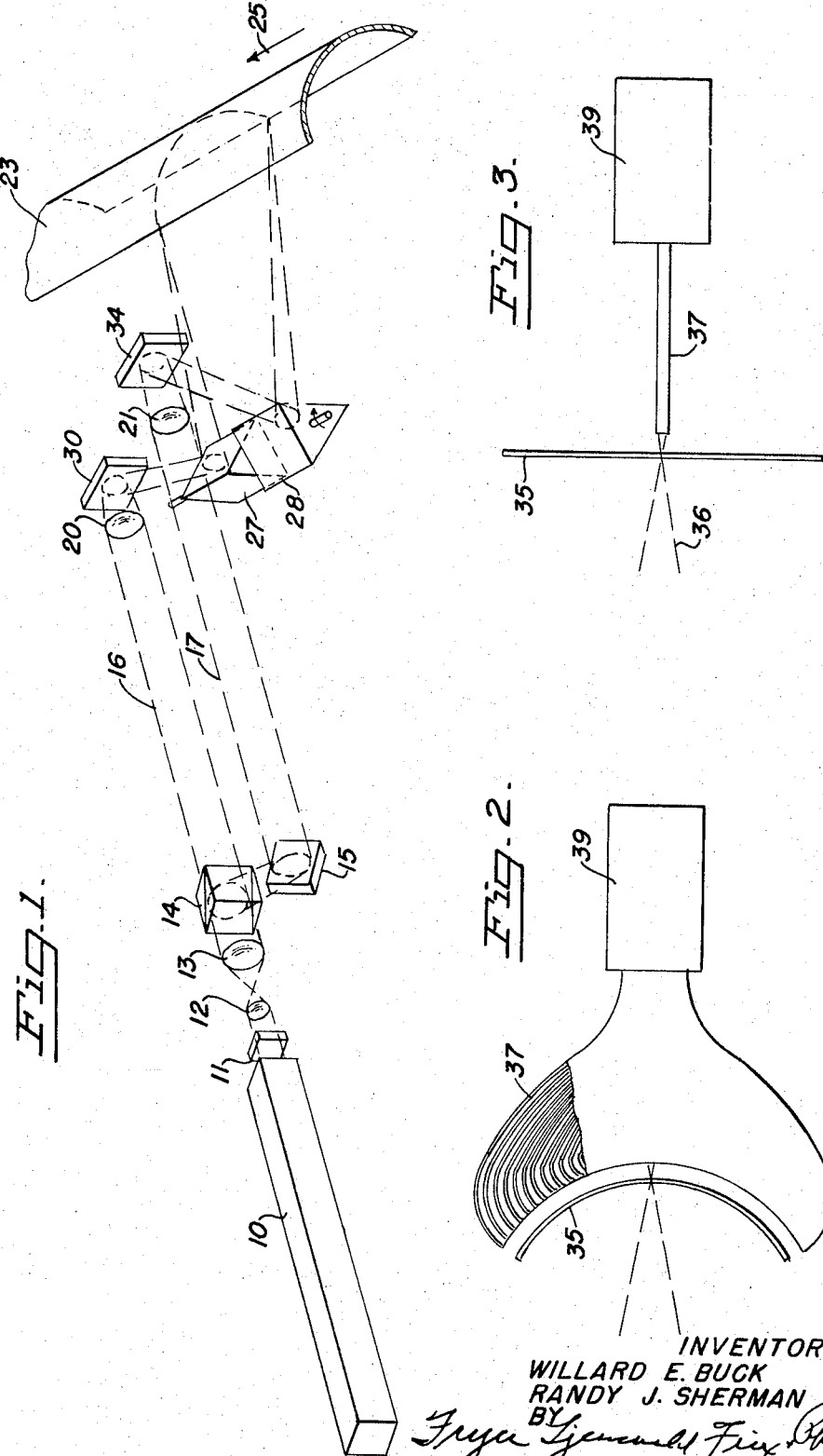
INVENTOR
WILLARD E. BUCK
RANDY J. SHERMAN
BY
ATTORNEYS

United States Patent Office 3,370,504
Patented Feb. 27, 1968

3,370,504
HIGH SPEED FACSIMILE METHOD AND APPARATUS
Willard E. Buck, Santa Clara, and Randy J. Sherman, San Jose, Calif., assignors, by mesne assignments, to Technical Operations, Incorporated, Burlington, Mass., a corporation of Delaware
Filed Mar. 29, 1965, Ser. No. 443,529
7 Claims. (Cl. 88—24)

ABSTRACT OF THE DISCLOSURE

Apparatus for producing a high speed reproduction or copy at one location of a discrete visibly discernable representation at another and remote location so as to enable a record on film to be transmitted, as by radio, to a second remotely located film.

---

The very high speed production of a facsimile has various possible uses as for example in connection with data storage and recovery for computer operations. Another extremely valuable use is that of producing a highly resolved facsimile on earth of a photographic record made and developed in outer space as for example on a missile in orbit or during an interplanetary mission. This makes possible a study of the objects or events recorded promptly and without regard to whether the missile is recovered. Since the method and apparatus of the present invention has been developed for such reproduction of photographic records, the present application will describe the invention as so used though various other uses will be apparent as the description proceeds.

It is known that a picture or any graphic representation on a translucent medium such as photographic film may be reproduced by scanning the film with a small beam of light in closely spaced paths and measuring the variations of intensity of the light which passes through the film. By translating such intensity to signals capable of transmission by radio or otherwise these signals may control a modulating device at a remote location which in turn modulates a second light beam. Thus when a sensitized film is scanned with the second light beam, the original picture is reproduced. The foregoing principles of producing facsimiles are employed in the present invention and the improvements of the invention relates to very high speed scanning mechanism which does not require oscillatory or reciprocating motion and produces a continuous uninterrupted scanning which produces a record of closely spaced parallel lines of finite length.

It is the object of the invention to provide improvements in the method and apparatus for high speed facsimile producing machines and particularly to provide an improved means and method for producing a scanning motion of a modulated light beam to produce a continuous record in the form of closely spaced lines across the surface of the sensitized film of finite width.

Further and more specific objects and advantages of the invention and the manner in which it is carried into practice are made apparent in the following specification wherein reference is made to the accompanying drawings.

In the drawings:

FIG. 1 is a perspective schematic view illustrating the principal components of the facsimile producing apparatus of the present invention;

FIG. 2 is a plan view illustrating means employed for producing a variable current by passing light through a film having a record thereon of which a facsimile is to be made; and FIG. 3 is a view in side elevation of the mechanism illustrated in FIG. 2.

In FIG. 1 of the drawings, a light source in the form of a gas laser is schematically illustrated at 10 and, as is characteristic of lasers, the very small beam produced thereby may be expanded as by lenses to form a larger beam of collimated light capable of being split, focused and otherwise treated in the manner of light in a camera or other optical instruments. In the present case, the beam of light from the source 10 is modulated by a device illustrated at 11 which may be a Kerr cell or other similar device capable of receiving signals representing varying intensity of light and capable of modulating the beam from the light source to correspond with the signal. The modulated beam is passed through a lens system comprising lenses 12 and 13 to convert the very narrow laser beam to a considerably wider beam of collimated light which is intercepted by a beam splitter 14 having a half mirrored surface disposed at an angle to the beam so that one-half of the light is permitted to pass through the surface while the other half is reflected toward one side where it is intercepted by a mirror 15. Thus two beams shown at 16 and 17 are directed toward lenses 20 and 21, respectively, which focus them to very small points through a mirror system to be described and at the surface of a strip of film represented at 23. This strip of film is fed from one reel (not shown) to another and is constantly driven to move in the direction of the arrow shown at 25.

As a point between the reels and where the focused beams of modulated light scan the surface of the film, the film is confined by means (not shown) to a curve or arcuate configuration, defined by the point of focus of the light beam as it is reflected from the face of either of a pair of rotating triangular mirrors shown at 27 and 28. These mirrors rotate at high speed on a common axis and in one form of the invention will rotate at approximately 2500 r.p.s., this rotation being imparted by a well known type of gas or air actuated turbine or by an electric motor (not shown). The beam of light 16 after being focused by the lens 20 passes, as shown in the drawings, to a mirror 30 which directs it to the surface of the rotating mirror 27 which mirror causes the focused point of the beam to sweep across the surface of the strip of film 23 in what will be referred to as an image arc represented by the broken line 32. This arc represents 120° of a curved line defined by the focal point of the two swept beams. Since the mirrors 27 and 28 are equilateral triangles, the instant that one mirror stops writing on the 120° of the sensitized film strip the other mirror will start because, as seen in the drawing the other parts 17 of the split beam is focused by a lens 21 through a mirror 34 which directs it to the rotating mirror 28 to cause it to be swept across the surface of the film strip.

The speed of travel of the film strip is such that the line exposed or written on the film by the beam of light from each mirror is immediately adjacent the one before it with a consequence that modulation of the intensity of the beam in accordance with a record on a remotely positioned film will produce a facsimile or duplicate of the record on the film in the machine described.

The remotely positioned film of which a facsimile is being made may be one which has just emerged from a camera and moved through a developing tank for process. A portion of this length will be supported in a curved configuration identical to the portion of film shown at 23 in FIG. 1 and it will be scanned by light beams from a pair of rotating mirrors identical with those shown in FIG. 1. The rest of the focusing system will also be like that of FIG. 1 with the exception that the modulating device 11 is omitted.

In FIG. 2, the film with the image to be reproduced is shown at 35 as having the same image arc as the film of FIG. 1 and as being swept by a focused beam represented at 36. Directly behind the film and closely adjacent thereto is the receiving face of a fiber optics bundle shown at 37 comprising a plurality of light conducting fibers which terminate at the receiving end of a photosensitive cell as represented at 39. Since the apex of the focused beam impinges the surface of the film 35 as also shown in FIG. 3 the light which has passed through the film diverges to agree in width with the end of a multiple layer of optical fibers. Since the film bears the image of an object or event to be reproduced by the machine of FIG. 1, the intensity of light will vary as the focused beams scans the film and the output of the photo-sensitive cell will vary accordingly. Consequently signals created by this output and imposed upon the Kerr cell of FIG. 1 will modulate the beam which is being focused on the film of the facsimile machine and the image of the original film will be reproduced.

It is important that the receiving surface of the fiber optics bundle be spaced at least a short distance from the film. If this surface which is made up of the ends of fibers in the order of .001 inch in diameter were to be placed at the film plane which is the focal point of the beam of light, an irregular effect would result from the light passing from one fiber to the next. With the present arrangement, the light diverging from the focal point covers several fiber ends and the irregularity due to motion of the beam is minimized.

We claim:

1. In an apparatus for producing a facsimile by scanning a sensitized film with a beam of light modulated in correspondence with an image to be copied, a splitter intercepting said beam to create two separate beams, means focusing said beams to points at the surface of the film, separate mirrors intercepting the focused beams, and means to move said mirrors to cause the beam to scan the film successively.

2. The apparatus of claim 1 in which the film is supported to present a surface in a curve which is coincident with the focus of the light reflected from the mirrors.

3. The apparatus of claim 2 in which the arc extends through at least 120° and the mirrors are of equilateral triangular configuration and are rotated about a common axis with the three mirror surfaces of each disposed at 60° to the other.

4. The apparatus of claim 3 with a similar beam splitting and focusing system to penetrate a film containing an image of which a facsimile is to be produced, means sensing the intensity of the beam leaving the image, and means to modulate the intensity of the facsimile producing beam in correspondence to the sensed intensity.

5. The combination of claim 4 in which the means sensing the intensity of the beam includes a fiber optics bundle.

6. The combination of claim 5 in which the beam of light is focused at the surface of the film and the fiber optics bundle receiving surface is spaced from the film to receive the beam at a point where it is diverging.

7. The apparatus of claim 1 in which said mirrors rotate about a common axis and are spaced axially with respect to each other.

References Cited
UNITED STATES PATENTS 3,328,523    6/1967    Treseder et al. _____ 178—7.6 X NORTON ANSHER, *Primary Examiner.*

RICHARD A. WINTERCORN, *Assistant Examiner.*